Jan. 28, 1958  C. M. L. L. BOURCIER DE CARBON  2,821,268
THERMOSTATIC SHOCK ABSORBER
Filed Dec. 16, 1953  3 Sheets-Sheet 1
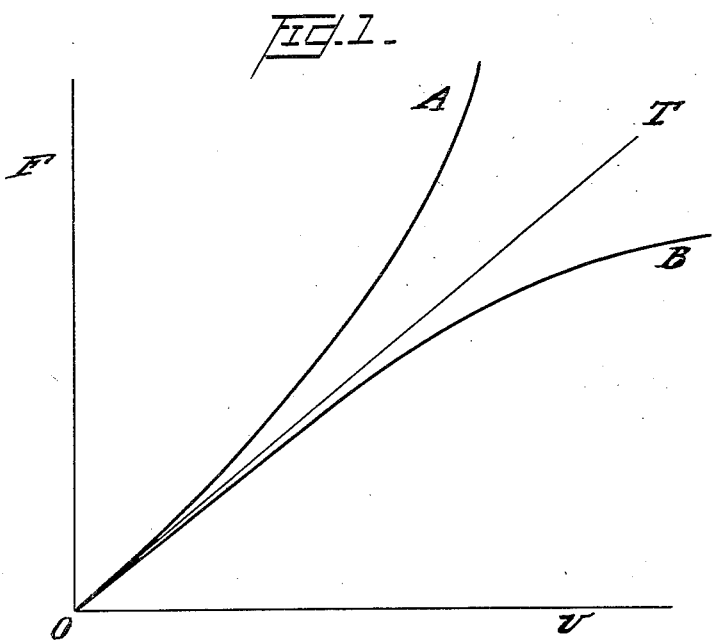
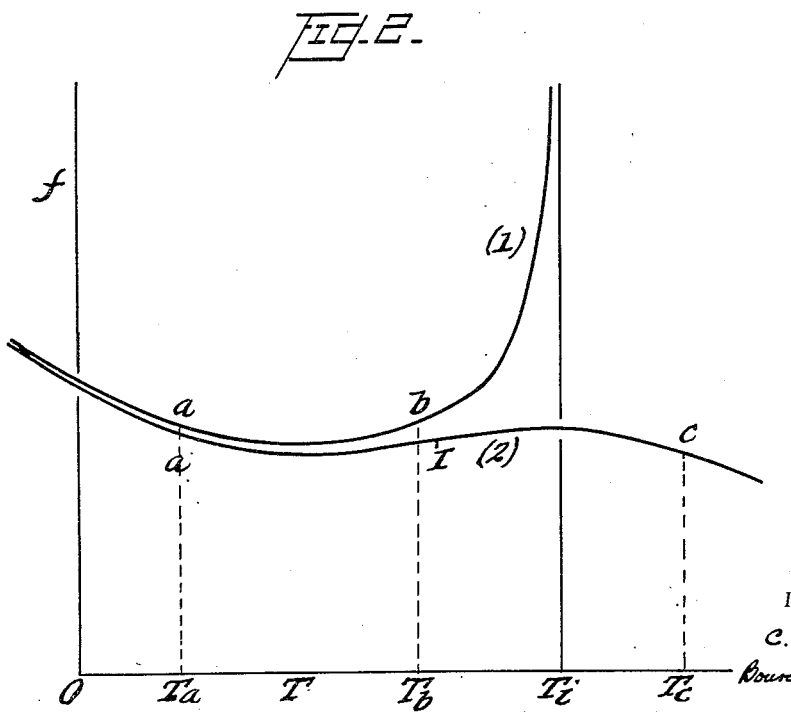

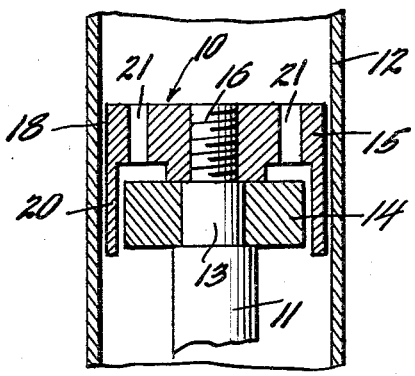
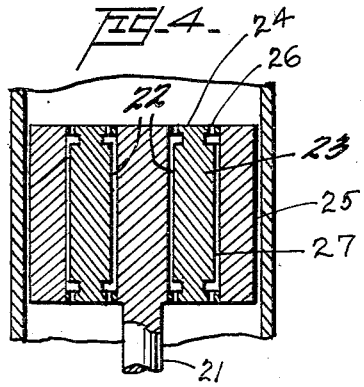
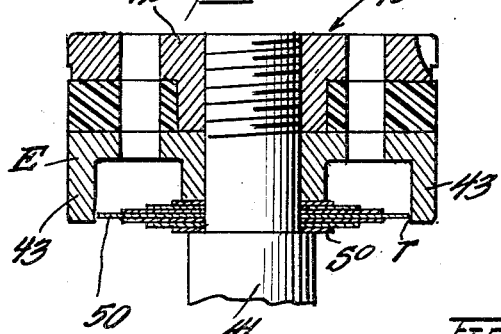
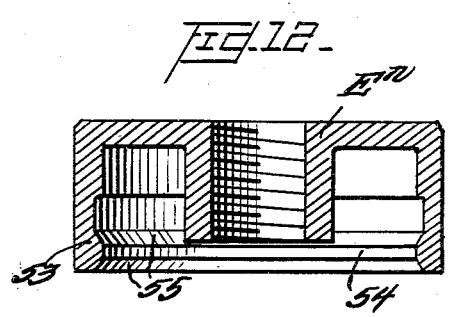
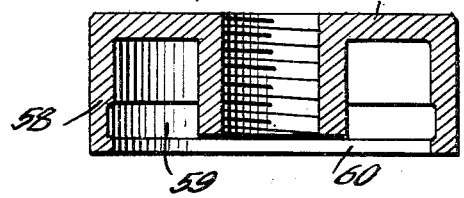

Jan. 28, 1958   C. M. L. L. BOURCIER DE CARBON   2,821,268
THERMOSTATIC SHOCK ABSORBER
Filed Dec. 16, 1953   3 Sheets-Sheet 3
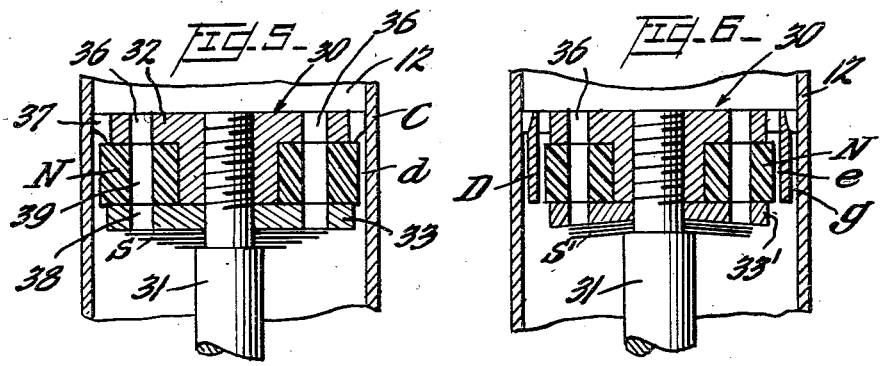
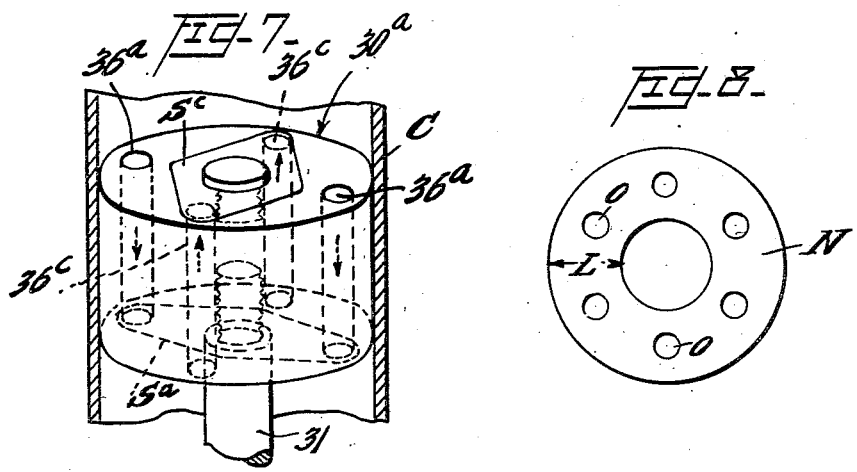
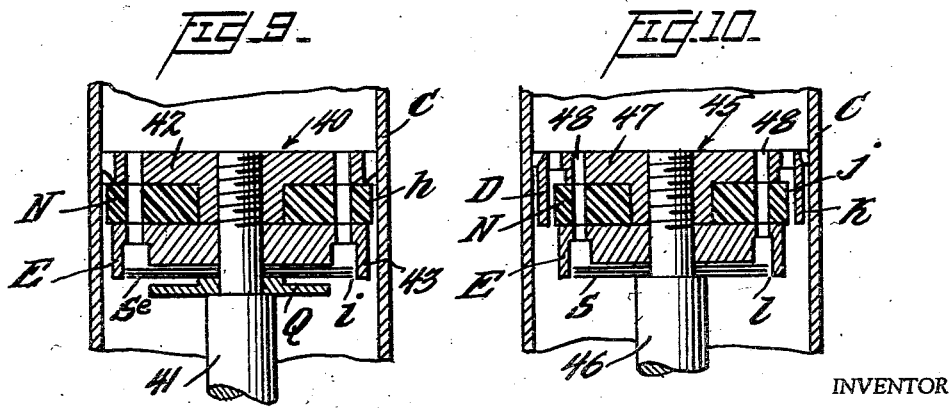
INVENTOR
C. M. L. L. Bourcier de Carbon
BY Watson, Cole, Grindle & Watson
ATTORNEYS United States Patent Office 2,821,268
Patented Jan. 28, 1958

2,821,268

THERMOSTATIC SHOCK ABSORBER

Christian Marie Lucien Louis Bourcier de Carbon,
Neuilly-sur-Seine, France

Application December 16, 1953, Serial No. 398,594

Claims priority, application France December 22, 1952

18 Claims. (Cl. 188—100)

This invention relates to shock absorbers for damping the relative movement of two members, and more particularly to shock absorbers of the type in which a piston, connected with one of the members, reciprocates or oscillates within a body of damping fluid contained in a casing secured to the other of said members.

The present invention is in part a development of certain of the subject matter of my copending applications Serial No. 22,836, filed April 23, 1948, now abandoned; Serial No. 99,796, filed June 17, 1949, now Patent No. 2,721,074, granted October 18, 1955; Serial No. 145,788, filed February 23, 1950, now Patent No. 2,719,612, granted October 4, 1955, and Serial No. 230,944, filed June 11, 1951, now Patent No. 2,748,898, granted June 5, 1956; and this present application may be considered as a continuation-in-part of application Serial No. 99,796, Patent No. 2,721,074.

The general object of the invention is to provide novel and improved features of construction and operation which will enhance the utility and advantage of the shock absorber, with particular reference to the factors of thermal compensation and piston valving.

More specific objects and purposes will become apparent from the following specification when read in connection with the accompanying drawings in which certain embodiments of the invention are illustrated by way of example.

In the drawings:

Figure 1 is a diagram comprising a graph in which the braking resistance is plotted against the speed of the piston of the shock absorber, and illustrating advantageous changes in the relationship brought about by the present invention;

Figure 2 is a graph in which the coordinates are the temperature and the coefficient of braking and showing curves comparing certain embodiments of the invention with the prior art;

Figure 3 is a somewhat diagrammatic fragmentary view in vertical section of a shock absorber embodying the multiple laminar bypass features of the invention;

Figure 4 is a similar view illustrating another embodiment of this feature;

Figure 5 is a similar view showing a simplified adaptation of the novel thermostatic compensation disc which is a subject of this invention, together with a certain novel bypass valving construction;

Figure 6 is a similar view showing the double lamination and another embodiment of the disc valving;

Figure 7 is a perspective view with the cylinder in section, showing a scheme for valving the piston in both directions in connection with the thermostatic lamination feature;

Figure 8 is a plan view of the thermostatic disc or block;

Figures 9 and 10 are vertical sectional views of portions of shock absorbers showing still further modifications of the thermostatic laminar bypass feature and the valving;

Figure 11 is a similar view showing a variation in the disc valving for the piston; and Figures 12 and 13 are similar views showing still further modifications of this feature.

Before explaining the underlying theories of the invention and the operation of the various embodiments, the structural details of the illustrated examples will be described.

The device shown in Figure 3 is illustrated rather diagrammatically, but it will be clear that the piston indicated generally by the reference numeral 10 is fixed upon the end of the piston rod 11 and reciprocates within the shock absorber cylinder 12. The rod 11 has a short portion 13 of smaller diameter upon which is fitted an annular plate or block 14 which is made of material having a coefficient of thermal expansion such that its radial expansion and contraction will serve to compensate for changes in the viscosity of the damping fluid by throttling or enlarging at least one of the bypass orifices through which said fluid flows upon reciprocation of the piston. The piston proper indicated at 15 is screwed upon a threaded portion 16 of the piston rod so as to clamp the plate or block 14 in position. The part 15 is of a diameter slightly smaller than the internal diameter of the cylinder 12 so as to provide a very thin laminar clearance space 18 around the piston through which the damping fluid may pass without valving or obstructions. The part 15 is provided with a depending skirt 20 and one or more bypass openings 21 which are of sufficient diameter to permit relatively free non-damping passage of the fluid.

Between the outer periphery of the block 14 and the inner surface of the skirt 20 there is a narrow laminar annular passageway $u$.

It will be seen that upon reciprocation of the piston 10 within the cylinder 12 the damping fluid will pass through the laminar clearance space or passageway 18 at a rate permitted by the viscosity of the fluid, and other portions of the damping fluid will pass through the openings 21 and the thermostatically controlled laminar passageway $u$, the latter passageway being contracted by expansion of the thermal disc or block 14 upon a rise in temperature, thus diminishing the cross-sectional area of the passageway and compensating for the increased fluidity of the damping medium. Contrariwise, upon operation at cooler temperatures, the fluid will become more viscous and the thermal disc 14 will be at the same time contract and afford a larger passageway for the thicker fluid.

In the embodiment illustrated in Figure 4 of the drawings, the piston indicated generally by the numeral 25 has a piston rod 21 and is bored as at 22 with one or more preferably cylindrical openings running lengthwise thereof and within these opening are fixed the cylindrical plug members 23.

These plugs 23 have disc-like terminal portions 24 which are provided with an anular series of perforations 26 through which the fluid may flow without serious damping.

Connected by means of narrow neck portions with the perforated heads 24 is a body portion 27 of uniform diameter which is slightly less than the diameter of the openings 22 so as to provide an extremely thin laminar clearance annular space $u$, corresponding in purpose and function with the space similarly designated in Figure 3 already described.

The embodiment shown in Figure 5 of the drawings embodies a cylinder 12, a piston 30 carried by a piston rod 31, and comprising the head element 32, and a lower plate member 33 between which is seized the plastic thermostatic plate or block N. The upper or head member 32 is provided with one or more passageways 36 and a ribbed or interrupted flange portion 37 comprising guiding means for the piston which function only as such and offer no substantial damping effect to the fluid. The plate 33 is provided with openings or passageways 38 in substantial vertical registry with the openings 36. The ring or annular plate N is also provided with vertical passageways 39 registering with the other bypass openings. The thermostatic ring N is spaced from the walls of the cylinder 12 the slight distance which is shown somewhat exaggerated at $d$ and this affords the thermostatically controlled bypassing of the fluid during movement of the piston.

To control or regulate the passage of the fluid upon the pressure stroke of the piston, there is provided the bank of thin disc leaf springs S. For the sake of clearness of illustration the discs have been shown by single lines in this view and the spacing exaggerated. The discs are of graduated diameter, the smallest on the bottom and the remainder piled upon the first one and in contact with each other, the uppermost disc being of a diameter to completely cover the annular series of openings 38 in the plate 33.

Figure 6 shows a multiple passage device in which there is an uncontrolled permanently open laminar annular bypass passageway shown at $g$, a thermostatically controlled annular laminar passageway $e$, and the valving is similar to that shown in Figure 5 with the exception of the arrangement of the spring discs S'. The lower face of the plate 33' is of a conical configuration and the discs S' are consequently given an initial springing for a purpose which will be later described.

Figure 7 is a purely diagrammatic view with the thermostatic ring features purposely omitted for the sake of clearness of illustration and valving shown for passageways for the movement of damping fluid in both directions. The piston 30a is provided with passageways 36a controlled by a substantially diamond-shaped leaf spring $S^a$ and the passageways permitting flow in the opposite direction are designated 36² and are controlled by the leaf spring valve $S^c$. It will be very readily seen how these valving passageways can be extended through a thermostatic disc such as shown at N in the other figures.

In Figure 8, one of the thermostatic discs N which may be made of nylon or other suitable thermostatic plastic, is shown in plan view. The openings are indicated at $o$ and the diameter of the annulus is indicated at L. The advantages and purposes of this construction will be pointed out presently.

In Figure 9 there is illustrated a variant form of piston arrangement somewhat similar in its general aspects to the one shown in Figure 5 of the drawings. The piston 40 has a stem 41, an upper flanged member 42 for guiding and centering the piston and also for clamping the thermostatic disc or plate N against the lower member E of the piston assembly. In this embodiment the thermostatically restricted annular laminar passageway is shown at $h$ while the skirt 43 of the lower member E surrounds the pack of spring valve discs $S^e$, the central portions of which may be clamped in position by means of the supplemental disc or plate Q. The margins of the discs present a narrow annular passageway $i$ with relation to the skirt 43.

In Figure 10 of the drawings the valving is somewhat similar to that in Figure 9, but the multiple laminar passageways are arranged more as in the embodiment shown in Figure 6. The piston 45 carried by the rod 46 has an upper member 47 carrying a guiding flange and provided with openings affording passage of fluid through the piston, namely, the always open laminar passageway $k$, the thermostatically controlled laminar passageway $j$, and the valving passageways 48 which lead through the thermostatic disc N and the lower member E and thence through the spring disc controlled annular laminar passage $l$.

In Figure 11 there is shown a rather simple execution of the invention which most clearly resembles the diagrammatic showing in Figure 9 of the drawings, and the basic parts are given the same reference characters. However, the spring valving disc assembly is comprised of discs of varying diameter tapering to smaller diameters in both directions from the central disc 50. The bottom disc of the stack $S^o$ rests directly against the shoulder formed on the piston rod 41 without the interposition of any stop plate such as at Q in Figure 9. This tapering of the discs provides an equalized graduated increase in stiffness of the spring assembly upon increase of pressure in either direction.

In Figure 12 the lower element $E^n$ is illustrated as a variant usable in any of the preceding arrangements. In this case the inner surface of the skirt 53 is provided with a central cylindrical surface 54 which bounds the fine laminar clearance space at the normal intermediate position of the spring valve pack and the tapering or sloping surfaces 55 provide for evenly graduated streamlined entrance and exit surfaces for the fluid passing in either direction beyond the warped or stressed valve disc.

In Figure 13 there is a still further embodiment of the lower member of the piston which is designated $E^p$. The skirt 58 has an enlarged portion 59 terminating in a narrow inwardly directed flange portion 60 which cooperates with the margins of the spring disc to provide the laminar space.

Having described the physical structure of the various embodiments, it is now appropriate to explain the advantages of the several arrangements in structure and performance.

In certain of the applicant's prior applications, particularly Serial No. 99,796, the applicant has described a laminar piston, that is, a viscous braking piston, the circulation of fluid from one side to the other thereof being effected either along a thin liquid film or sheet between the body of the piston and the inner cylinder walls, or alternatively along a system of thin or narrow slots provided through or alongside of the piston and substantially parallel to the axis thereof. Such slots should be themselves either cylindrical or of considerable arcuate extent in order to preserve the viscous braking characteristics of the damping and to avoid the usual kinetic damping effected by ordinary orifices passing through the piston.

Thus the main purpose of the device may be realized which is the imparting of a braking resistance F which is approximately proportional to the speed $v$ of the piston. The braking resistance F is, as a matter of fact, then related to the speed $v$ of the piston according to the equation $F = fv + Kv^2$, the term $Kv^2$ being relatively small as compared with the term $fv$. The curve showing the variations of F as a function of $v$ has a shape similar to that of curve A in Figure 1 of the drawings. In this figure it will be seen that the coordinates of the graph depicted are F and $v$.

Since the essential purpose of a shock absorber piston in accordance with the concept of the applicant, is to impart a braking resistance F which is proportional to the velocity $v$ of the piston in accordance with the law $F = fv$, and with a well defined coefficient of resistance $f$, such a piston still has two defects which must be corrected simultaneously, and this correction constitutes one of the principal objects of the present invention.

The first of these defects is the decrease in the coefficient of resistance $f$ as a result of the decrease in the viscosity of the oil when the temperature rises. The remedy proposed for this condition consists in using a laminar cylindrical passage between a metallic outer cylinder and an inner cylinder or disc (N in the drawings) having a high coefficient of thermal expansion, the disc being made of such plastic material as nylon, polystyrene, Plexiglas, or the like. Thus it has a very high coefficient of expansion so that the passage offered the oil is automatically decreased when the temperature increases. These thermostatically controlled passages are indicated at $u$ in Figures 3 and 4, $d$ in Figure 5, $e$ in Figure 6, $h$ in Figure 9, and $j$ in Figure 10. It can easily be seen that this decrease in the passage offered the oil when the temperature increases will within a given temperature range bring about a thermostatic compensation. The outer wall of the laminar slot can be either the inner wall of the working cylinder C or 12 of the shock absorber as illustrated in Figures 5 and 9, or by a concentric cylindrical wall such as shown at 20 in Figure 3 or at D in Figures 6 and 10.

The latter arrangement as illustrated in Figures 6 and 10 has several substantial advantages. (1) In case of excessive expansion as a result of overheating of the apparatus, the plastic compensating cylinder disc or plate is not liable to become jammed against the wall of the cylinder of the shock absorber, which would result in a seizing of the piston in the cylinder and consequent damage to the apparatus; in case of such overheating, the disc would only jam against a wall or skirt which is integral with the piston itself and which would present no serious drawback from this point of view. (2) Better centering of the plastic thermo-compensating disc may be obtained and a more precise control of the lamination damping effect. (3) The possibility is afforded of having a second laminar passage between the piston and the work cylinder, for example at 18 in Figure 3, $g$ in Figure 6, and $k$ in Figure 10, which has the effect for a given coefficient $f$ of increasing the total passage surface as can be readily shown by a simple calculation, and therefore decreasing the coefficient K and thus improving the qualities for lamination. All in all, the provision of this secondary laminar passage affords the possibility of a much better thermostatic compensation.

As a matter of fact, it is easy to show theoretically—and furthermore confirmed empirically—that with a single lamination per slot between the inner disc or cylinder of plastic material and the outer metallic cylinder (for example see Figure 5) the curve showing the change in the coefficient of the braking $f$ of the shock absorber as a function of the temperature T has the shape of curve (1) of Figure 2 in the drawings, the braking coefficient increasing substantially at high temperatures and even becoming infinite for a given temperature $T^1$ when the wall of the plastic disc comes into contact with the inner wall of the shock absorber cylinder. When double or multiple lamination is used, the danger of seizing is obviously eliminated. Furthermore, curve (1) of Figure 2 is replaced by curve (2), and it is found that, on the one hand, when the secondary laminar passageway is sufficient, it is possible to avoid the "hardening" of the apparatus at high temperatures, the hardening of the principal lamination within the piston being then compensated by the greater ease in passage through the secondary lamination. On the other hand, it is also found that the range of temperatures of the substantially constant braking is considerably extended as can be seen by comparing curves (1) and (2) of Figure 2. The region $ac$ of curve (2) is, as a matter of fact, much larger than the region $ab$ of curve (1) because of the existence of a point of inflection I between the points $a$ and $c$. This is a very important improvement since it assures the apparatus constant operation under greatly varied temperature conditions.

It may be truly stated that this double lamination provision constitutes, with respect to the thermostatically compensated lamination piston, a step forward which is just as important as the one realized by the latter improvement over the single lamination piston without thermostatic compensation. Also, it is to be understood that the scope of this phase of the invention is thought to be broad enough to embrace a system (which would not be as efficient as the ones already described) which includes along with the thermostatic compensation lamination, a second passageway of uniform section through the piston which would not necessarily have to be itself a laminar passageway but could be a canal or conduit of any section whatsoever.

The second one of the drawbacks alluded to above, and which it is now intended to remedy, is the existence of the upward curvature of curve A of Figure 1 as a result of the existence of the term $Kv^2$ in the formula $F = fv + Kv^2$.

The remedy in this case consists in using auxiliary passageways which are normally closed by valves which preferably consist of a pile or stack of very thin "tinsel" foils, these foils being of very low inertia and opening progressively as a function of the pressure of the fluid, and these foils being preferably, though not necessarily, of circular shape.

Figures 5, 6, 7, 9, 10 and 11 illustrate several embodiments of this feature. It can be readily seen that the use of such valves which progressively uncover passages which are thus added to the permanent laminar passageways, can make it possible to replace curve A of Figure 1 by a curve which is much closer to a straight line as at OT, or even by a curve having the shape of curve B, which is concave in the opposite direction.

The use of such discharge valves which permit this downward alteration of curve A of Figure 1 is not indispensable in the direction of the expansion of the shock absorber as upon the rebound stroke; however, it is indispensable in the direction of compression in most shock absorbers of the telescoping type in order to limit the pressures exerted on the wall of the usual compensation or "cavitation" chamber provided for compensating for the volume displaced by the piston rod, or upon the valve system which places the compensation chamber in communication with the working chamber.

Such valves consisting of a stack of thin discs or leaves can therefore be arranged either ($a$) in connection only with the compression movement and therefore on a single side of the piston (which makes possible the very simple embodiments such as shown at S and $S^1$ in Figures 5 and 6), or ($b$) in both directions of operation and therefore upon both sides of the piston as shown at $S^a$ in Figure 7, for example. It should be borne in mind that the diagrammatic showing of Figure 7 is merely to suggest the two-way valving, and the details of the thermal compensation features have been omitted for the sake of convenience.

Obviously, without going beyond the scope of the present invention, other variations in detail can be provided for the embodiment of such progressively opening valves which operate in both directions combined with the thermostatic compensation lamination by the use of a plastic disc arranged as suggested, for example, in Figure 5 or 6.

All of these valves each consisting of a pile of foil discs can be arranged flat as shown in Figures 5 and 7 or applied at a conical angle, thus generating an initial stress, as suggested in Figure 6, so that the progressive opening of the valve as a function of the pressure, does not begin until a certain threshold force and pressure have been exceeded. Furthermore, the discs of the pile may be of the same size as shown in Figures 6, 9 and 10 or of decreasing size as in Figure 5 and in Figure 11, this latter arrangement permitting the better utilization of the elastic properties of the steel foil discs. In certain cases the spring disc valves may be reduced to a single disc or foil as shown, for example, in Figure 7. The advantage of using a pile or stack of discs or foils lies in the fact that this makes it possible for one and the same operating regime of the valve to demand less intense work from the metal and thus avoid permanent deformations and decreases in the efficiency of the shock absorbers after a certain period of use.

Another variant in the use of progressively opening disc valves is shown in Figures 9 and 10. This consists in the provision of a cylindrical laminar passageway ($i$ in Figure 9 and $l$ in Figure 10, and $r$ in Figure 11) between the skirt of the lower cylindrical piston member E and the margin of the stack of discs itself. The virtue in this arrangement is that it actually provides a laminar passage, the coefficient of resistance of which automatically decreases as a function of the force when there is concerned a force which tends to compress the shock absorber. This reduction of the coefficient of resistance has two distinct causes. (1) As a result of the pressure exercised by the oil upon the upper face of the pile of discs, this pile or stack of flexible discs or foils becomes deformed towards the bottom, becoming progressively free from the cylindrical part E (Figures 9, 10 and 11), the height of the lamination then decreasing as well as the coefficient of the resistance opposed to the passage of the oil. (2) This downward bending of the discs or foils is accompanied by an increase in the thickness of the laminar passage, that is, the distance between the skirt of the part E and the disc pile S; from this there results a second distinct cause which contributes to reducing the coefficient of resistance of the passage to the oil.

The operation just described imposes quite a bit of work upon the foil discs, but their fatigue may be reduced by limiting their deformation downward by means of a part Q acting as an abutment plate to take the thrust of the downwardly bending leaves or foils, as shown in Figure 9.

It will be noted that the piston shown in Figure 10 is actually a triple lamination piston having a first laminar passage j with thermostatic compensation, a second fixed laminar passage k, and finally a third laminar passage l acting as a valve progressively opening and closing the laminar passage.

The present applicant has already disclosed in some of his earlier applications a piston which includes the combination of a laminar action with thermostatic compensation and other valved passageways through the piston itself. However, they were not concerned, on the one hand, with valves of the flat foil disc type which open progressively with the pressure applied, but valves controlled by calibrated coil springs. Such valves are practically without any progressive effect and this is not the most favorable arrangement to a satisfactory operation of the apparatus in affording maximum riding comfort. Furthermore, such valves have the serious drawback of very easily giving rise to vibrating motions which generate unpleasant noise. On the other hand, the thermostatic compensation is effected not by means of a comparatively solid disc or plate of plastic material, but by a simple comparatively narrow (widthwise) plastic ring—that is to say, a ring having an inside diameter very close to its outside diameter. Such an arrangement is not the best provision for the purpose, for the following reasons: (1) When the ring expands under the action of heat, there is no assurance that it will remain centered and this risks the serious modification of the coefficient of resistance of the laminar passageway. (2) The plastic ring becomes deformed very readily and sometimes is distorted to a somewhat oval configuration, which also modifies the coefficient of resistance of the laminar passage. (3) At low temperature, the plastic ring may contract down to or beyond the dimension of the piston itself and thus eliminate the thermostatic compensation. There results from this that such a piston becomes very hard at low temperatures. (4) Finally and of the greatest importance, the instantaneous transmission of the pressure on the inner surface of the ring brings about (during operation and during the application of forces upon the apparatus) an artificial expansion of the nylon ring, said expansion serving to contract the laminar passage offered to the oil without regard to thermostatic conditions; this disastrously upsets the laws of operation of the apparatus. With a solid disc of plastic material as provided in the present invention, that is to say, a disc having a relatively small inside diameter with regard to its outside diameter (see Figure 8) the four above mentioned drawbacks are all eliminated. A very superior operation of the piston then results which assures much softer and more comfortable travel while retaining an efficiency which is less subject to variation.

Therefore, it is of great interest to reduce as much as possible the inside diameter of the disc N so as to have a very considerable radial width L as in Figure 8. In such a case, one can no longer have the valve controlled passageways through the piston pass within the central orifice of the plastic ring, as also readily done when using a simple ring having a width L of only say 4 or 5 millimeters. The disc of plastic material in this case must be pierced within its width L by the holes o for the passage of the oil through the valve controlled system.

In the embodiment shown in Figure 11 of the drawings the effective margin of the central blade 50 of the valve pack is normally disposed an exceedingly slight distance above the lower edge of the skirt 43 so that upon the compression stroke the valve is not long in opening to maximum capacity, and once the edge passes the lower end of the skirt, the passageway for the fluid is immediately greatly increased. On the other hand, upon the rebound or expansion stroke the upward movement of the valve 50 is only gradually bent away from the inner wall of the skirt 43 and the laminar space r is increased to a less degree than upon the compression stroke.

According to Figures 12 and 13, however, once the effective leaf of the disc valve passes the limits of the narrow cylindrical surfaces 54 and 60 the controlled passageway increases rather rapidly in either direction of movement of the spring valve.

It is understood that various changes and modifications may be made in the embodiments illustrated and described herein without departing from the scope of the invention as defined by the following claims.

Having thus described the invention, what is claimed as new and desired to be secured by Letters Patent is:

1. A direct acting hydraulic shock absorber for controlling the relative movements of two members comprising, in combination, a substantially cylindrical casing secured to one of said members, said casing enclosing a working chamber containing a hydraulic damping fluid, a piston adapted to reciprocate in said working chamber, and a piston rod fixed to said piston and connected to the other of said relatively reciprocating members; a plurality of normally open restricted effective damping passageways, each extending through said piston independently of and in parallel with the others, and all affording means for bypassing working fluid from one side of the piston to the other upon the occurrence of compression or rebound movements of the piston within the casing, certain of said passageways being exceedingly thin and laminar and of extended arcuate section in order to effect viscosity damping rather than kinetic damping, and having at least one of its walls constituted of material having a relatively high coefficient of thermal expansion, and other of said passageways being continually open and uncontrolled.

2. The shock absorber as set forth in claim 1, in which the said other passageways recited are also of thin laminar section and of considerable arcuate extent.

3. The shock absorber as set forth in claim 2 in which all of the passageways are annular, and the thermostatically controlled laminar passageway is surrounded by an annular laminar passageway which is not thermostatically controlled.

4. The shock absorber as set forth in claim 3 in which all of the passageways are concentric and of different diameters.

5. The shock absorber as set forth in claim 2 in which still other bypass passageways are provided through the piston which are controlled by thin spring-leaf valves adapted to progressively open under working fluid pressure when the piston moves in the compression direction.

6. A shock absorber piston of the class described having an extremely thin annular laminar bypass passageway passing therethrough, the inner wall of said passageway comprised of the cylindrical outer surface of an annular block of thermostatic material secured to the piston body centrally thereof, said block being of substantial radial thickness, to preclude warping or distortion, better maintain its concentric position with respect to the piston, and afford maximum projection into the annular laminar space to prevent complete retraction upon extreme contraction under cold conditions; and additional passageways through said piston affording communication between the opposite sides of the piston in parallel with said laminar thermally controlled passageway.

7. The shock absorber as set forth in claim 6 in which other bypass passageways are provided through the piston which are controlled by thin spring-leaf valves adapted to progressively open under working fluid pressure when the piston moves in either direction.

8. The shock absorber as set forth in claim 4 in which the walls of the outer annular laminar passageway are comprised by the inner wall of the cylindrical casing and the outer cylindrical wall of the major or effective portion of the piston; and the walls of the inner thermostatically controlled annular laminar passageway are comprised by the cylindrical inner wall of a skirt portion of the piston and the outer cylindrical surface of a block of thermostatic material secured to the piston body centrally thereof.

9. The shock absorber as set forth in claim 8 in which the block of thermostatic material is annular and of substantial radial thickness, to preclude warping or distortion, better maintain its concentric position with respect to the piston, and afford maximum projection into the annular laminar space to prevent complete retraction upon extreme contraction under cold conditions.

10. The shock absorber as set forth in claim 9 in which other passageways are provided passing through the piston radially inwardly of the said annular passageways and also registering with corresponding openings formed in the thermostatic block.

11. The shock absorber as set forth in claim 2 in which still other bypass passageways are provided through the piston which are controlled by thin spring-leaf valves adapted to progressively open under working fluid pressure when the piston moves in at least one direction, said valves comprising a plurality of contiguous spring discs, said discs being prestressed in one direction.

12. The shock absorber as set forth in claim 6 in which other bypass passageways are provided through the piston which are controlled by thin spring-leaf valves adapted to progressively open under working fluid pressure when the piston moves in at least one direction, said valves comprising a plurality of contiguous spring discs, and a back stop element rigid with the piston assembly against which the spring disc valve may abut to limit its opening movement.

13. The shock absorber as set forth in claim 6 in which other bypass passageways are provided through the piston which are controlled by thin spring-leaf valves adapted to progressively open under working fluid pressure when the piston moves in at least one direction, said valves comprising a plurality of contiguous spring discs, said spring disc valve leaves being of graduated diameters, the widest being adjacent to the orifice of the passageway which it controls.

14. The shock absorber as set forth in claim 6 in which other bypass passageways are provided through the piston which are controlled by thin spring-leaf valves adapted to progressively open under working fluid pressure when the piston moves in at least one direction, said valves comprising a plurality of contiguous spring discs, the spring disc valve leaves being graduated in both directions from the widest central disc.

15. The shock absorber piston assembly as set forth in claim 6 having an annular bypass passageway therethrough, said passageway bounded by an inner cylindrical wall within the piston body and a central stem portion of the piston body, valving means controlling the passage of working fluid through the passageway and comprising a plurality of superposed thin leaf-spring discs, the outer periphery of the pack of discs being spaced inwardly of the outer cylindrical wall of the passageway by a minute distance, said spring pack valving means being adapted to yield progressively in either direction upon corresponding movement of the piston through the working fluid of the shock absorber, to progressively increase and decrease the capacity of the passageway.

16. The shock absorber as set forth in claim 15 in which the valving means is disposed adjacent the lowermost portion of the outer cylindrical surface of the passageway, whereby the valving means when opening toward the end of said surface abruptly passes said surface and increases rapidly the passage of fluid.

17. The shock absorber as set forth in claim 15 in which a surface portion on the outer wall of the annular passageway in the vicinity of the outer margin of the valving means is of quite limited vertical extent and the surface portions of said outer wall above and below said first named surface portion are cut back to a larger diameter, whereby suddenly increased opening of the passageway is afforded when said valving means moves beyond said first named narrow surface portion in either direction.

18. A shock absorber piston of the class described having an extremely thin annular laminar bypass passageway passing therethrough, the inner wall of said passageway comprised of the cylindrical outer surface of an annular block of thermostatic material secured to the piston body centrally thereof, said block being of substantial radial thickness, said thickness of the annular block in a radial direction being not less than about 60% of its full outside radius, to preclude warping or distortion, better maintain its concentric position with respect to the piston, and afford maximum projection into the annular laminar space to prevent complete retraction upon extreme contraction under cold conditions; and additional passageways through said piston affording communication between the opposite sides of the piston in parallel with said laminar thermally controlled passageway.

References Cited in the file of this patent

UNITED STATES PATENTS

| | | |
|---|---|---|
| 1,143,753 | Fernanzo | June 22, 1915 |
| 1,407,320 | Bouche | Feb. 21, 1922 |
| 1,484,193 | Scott | Feb. 19, 1924 |
| 1,871,287 | Whittaker | Aug. 9, 1932 |
| 1,883,514 | Boyer | Oct. 18, 1932 |

FOREIGN PATENTS

| | | |
|---|---|---|
| 472,991 | Great Britain | Oct. 4, 1937 |
| 653,869 | Great Britain | May 30, 1951 |
| 460,421 | Italy | Nov. 30, 1950 |
| 838,403 | Germany | May 8, 1952 |